United States Patent
Zeidler

(10) Patent No.: US 11,066,882 B2
(45) Date of Patent: Jul. 20, 2021

(54) APPARATUS AND METHOD FOR EARLY KICK DETECTION AND LOSS OF DRILLING MUD IN OILWELL DRILLING OPERATIONS

(71) Applicant: H. Udo Zeidler, Longview (CA)

(72) Inventor: H. Udo Zeidler, Longview (CA)

(*) Notice: Subject to any disclaimer, the term of this patent is extended or adjusted under 35 U.S.C. 154(b) by 0 days.

(21) Appl. No.: 17/091,909

(22) Filed: Nov. 6, 2020

(65) Prior Publication Data

US 2021/0054703 A1    Feb. 25, 2021

Related U.S. Application Data

(62) Division of application No. 16/598,149, filed on Oct. 10, 2019, now Pat. No. 10,907,426.

(60) Provisional application No. 62/769,858, filed on Nov. 20, 2018, provisional application No. 62/745,493, filed on Oct. 15, 2018.

(51) Int. Cl.
| | | |
|---|---|---|
| E21B 47/06 | (2012.01) | |
| E21B 21/08 | (2006.01) | |
| G01F 1/34 | (2006.01) | |
| G01M 3/28 | (2006.01) | |

(52) U.S. Cl.
CPC ............. *E21B 21/08* (2013.01); *E21B 47/06* (2013.01); *G01F 1/34* (2013.01); *G01M 3/2815* (2013.01)

(58) Field of Classification Search
USPC ...................................................... 73/152.21
See application file for complete search history.

(56) References Cited

U.S. PATENT DOCUMENTS

| | | | |
|---|---|---|---|
| 3,811,322 A | 5/1974 | Swenson | |
| 4,535,851 A | 8/1985 | Kirkpatrick | |
| 4,549,432 A * | 10/1985 | Bland | G01F 15/08 |
| | | | 73/200 |
| 5,168,932 A | 12/1992 | Worrall et al. | |
| 6,257,354 B1 | 7/2001 | Schrader et al. | |
| 10,048,673 B2 | 8/2018 | Holmes et al. | |
| 10,138,723 B2 | 11/2018 | Pettapiece et al. | |
| 10,145,198 B2 | 12/2018 | Papadimitriou et al. | |
| 10,151,159 B2 | 12/2018 | Gottlieb et al. | |
| 10,233,708 B2 | 3/2019 | Bernard | |
| 10,294,742 B2 | 5/2019 | Lovorn et al. | |
| 10,352,159 B2 | 7/2019 | Rowe | |
| 2013/0008647 A1 | 1/2013 | Dirksen | |
| 2013/0118752 A1 | 5/2013 | Hannegan | |
| 2014/0262516 A1 | 9/2014 | Larson | |
| 2014/0305662 A1 | 10/2014 | Giroux | |
| 2015/0000982 A1 | 1/2015 | McDowell | |
| 2015/0040755 A1 | 2/2015 | Nott | |

* cited by examiner

*Primary Examiner* — John Fitzgerald
*Assistant Examiner* — Rodney T Frank
(74) *Attorney, Agent, or Firm* — Paul & Paul

(57) ABSTRACT

Apparatus for early detection of drilling mud gains or losses that is positioned in the return wellbore of oilwell drilling operations, includes a pair of an upper and lower pressure sensor in an apparatus that is positioned in the return wellbore of an oilwell drilling operation as well as a flow chamber having an inlet port, an outlet port, a flow tube and a flow sensing device for determining the gains or losses in the return wellbore.

5 Claims, 4 Drawing Sheets

APPARATUS AND METHOD FOR EARLY KICK DETECTION AND LOSS OF DRILLING MUD IN OILWELL DRILLING OPERATIONS

CROSS-REFERENCE TO RELATED APPLICATIONS

The present application is a divisional of U.S. Utility patent application Ser. No. 16/598,149, filed Oct. 10, 2019 and claims the benefit of U.S. Provisional Patent Application 62/745,493, filed Oct. 15, 2018, and U.S. Provisional Patent Application 62/769,858, filed Nov. 20, 2018, each of which is incorporated herein in its entirety by reference.

BACKGROUND OF THE INVENTION

1. Field of Invention

The present invention relates to apparatuses and methods for the early detection of even a small change in the return wellbore flow rate of the drilling mud in Oilwell drilling operations.

2. Brief Description of Prior Art

In offshore and onshore oil and gas drilling operations, a drilling mud is typically pumped down to the drilling bit in the inside of a drilling string assembly. After the drilling mud has passed through the drilling bit, it flows upward in a wellbore through a plurality of annuli to the surface of the drilling operation. As the drilling bit penetrates through new rock, the wellbore is subjected to the pore pressure of the new rock, and if this pore pressure is greater than the pressure in the wellbore at the drilling bit, formation fluid can enter the wellbore and combine with the drilling mud to flow upward. Thereby the volume rate of drilling mud that is flowing upward in the wellbore increases. In the event that this increase in the wellbore flow rate is not detected early enough, a blowout may occur. Alternately, if the pore pressure in the new formation is less than the bottom hole wellbore pressure, or the bottom hole wellbore pressure exceeds the pressure that an exposed formation can withstand, drilling mud can flow into the formation, and at least a portion of the drilling mud will be pumped and lost into the new rock formation, that is, lost circulation will occur which may be a precursor to a blowout.

Proposed solutions to the problems associated with well blowout detection are known.

U.S. Pat. No. 5,168,932 discloses comparing the variation of the fluid content in a body of fluid, (i.e., drilling mud) to the level (i.e., height) of the drilling mud flowing in a partially filled conduit extending between the return wellbore and an offshore structure floating above the return wellbore (i.e., the return line) as a means for detecting whether drilling mud is flowing into a subsea formation (i.e., a loss of drilling mud into a subsea formation) or, whether formation fluid is from a subsea formation (i.e., a gain of fluid from a subsea formation).

U.S. Pat. No. 6,257,354 discloses the use of a thermal sensor or floating electromagnetic sensor for determining the flow rate in the return line, height sensor for determining the flow rate in the return line, either an ultrasonic, thermal or electromagnetic sensor to measure in the input line to measure the flow rate into the return wellbore, and a density sensor to provide the density of the fluid in the return line.

U.S. Pat. No. 9,546,891 discloses attaching an arc shaped housing ("housing") attached to a marine riser (i.e., return wellbore), said housing having a propeller or helical screw shaft, whose rotational speed and direction of rotation determine the direction and volume through a louvered opening in the housing. Within the housing are two hinged flow plates.

U.S. Pat. No. 10,151,159 discloses an apparatus for detecting potential "kicks" in an oil and gas drilling operation. The apparatus includes a drilling mud analyzer positioned along the mud return path closer to the wellhead than the mud tank of the mud circulation system. Potential kicks can be identified by a sensed change in drilling mud parameters, such as temperature, density, gas content, pressure and volume flow.

There is a genuine need for an apparatus and method that can detect a change in the flow rate of the return wellbore early enough in order to prevent potential blowouts.

SUMMARY OF THE INVENTION

The present invention provides three different, but equally capable apparatuses to detect and warn operators in both offshore and onshore drilling operations that gas, oil or water is beginning to flow into the wellbore, or that the drilling fluid is starting to be lost to an exposed formation. These wellbore flow detection apparatuses can detect a wellbore fluid influx or wellbore fluid efflux significantly earlier compared to other methods. The early detection methods and apparatuses of this invention can be applied while drilling or circulating, while tripping, while the marine riser is being boosted, or while the drilling mud is stagnant in the wellbore. The apparatuses not only can significantly improve the safety of drilling operations; they can also reduce the environmental footprint of drilling operations; they can reduce the amount of oil that is spilled into the oceans and on land; and they can also protect fish and wildlife.

The first apparatus ("Pressure Sensing Apparatus") is equally applicable in both offshore and onshore drilling operations. The Pressure Sensing Apparatus comprises a central pipe preferably having the same internal diameter as the internal diameter of the return wellbore in which it is placed and preferably three pressures sensors, each have a pair of pressure sensing ports to provide access to the central pipe. Preferably, said pressure sensors in the invention are pressure transducers. The three pairs of pressure sensing ports each are placed in the same plane parallel the axis of the central pipe. Not underestimating the other benefits these apparatuses can provide, three pressure sensors have been selected primarily to assure and improve the safety of drilling operations. The three pairs of pressure sensing ports are preferably equally spaced at 120 degrees around the Pressure Sensing Apparatus and the two ports in each pair are placed sufficiently for apart to detect a measurable, frictional pressure loss between said three pairs of ports respectively. After the hydrostatic pressure difference between the upper and lower pressure sensor port of each pressure sensor is accounted for, because a fluid will flow in the direction of decreasing pressure, knowing whether the upper or lower pressure sensor port indicates the higher pressure will determine whether fluid is being lost or gained in the wellbore. For floating offshore wells the location of the Pressure Sensing Apparatus is placed at least one marine riser joint below the bottommost position of the slip joint. For jack-up type offshore drilling operations the Pressure Sensing Apparatus is preferably placed about 8 m (25 ft)

below the blowout preventer. For onshore wells the Pressure Sensing Apparatus essentially replaces the bell nipple. Since the mud level in the wellbore must be kept above the Pressure Sensing Apparatus at all times, for both offshore and onshore wells the Pressure Sensing Apparatus will also indicate the mud level in the wellbore at all times. As an alternative to the central pipe of the Pressure Sensing Apparatus, the preferably three pairs of pressure sensors can be similarly attached directly to the marine riser in offshore drilling operations or to the bell nipple in onshore drilling operations.

The Pressure Sensing Apparatus and its methods can also be applied to pipelines for detecting where in a pipeline leaks are occurring by placing a plurality of Pressure Sensing Apparatuses at selected points along the pipeline. For pipeline applications the Pressure Sensing Apparatus preferably comprises only one pressure sensor, its internal central pipe diameter is preferably of the same internal diameter as the internal diameter of the pipeline itself and the Pressure Sensing Apparatus is preferably placed horizontally. Alternately, a plurality of can be attached along an existing pipeline. Here the ports of the pressure sensors are preferably spaced apart, along the existing pipeline, by the same separation distance as the ports of the pressure sensors of the Pressure Sensing Apparatus.

For both offshore and onshore drilling operations the Pressure Sensing Apparatus is preferably removed after cessation of all drilling operations.

The apparatus of the second embodiment of the invention ("Flow Chamber Apparatus 1") is more suitable for offshore drilling operations. For the same reasoning as for the Pressure Sensing Apparatus, Flow Chamber Apparatus 1 preferably comprises three flow chambers and their respective, oppositely placed (juxtaposed) pressure sensors for detecting flow in the return wellbore which are all placed in the same plane parallel the axis of a central pipe of the Flow Chamber Apparatus. The central pipe of Flow Chamber Apparatus 1 preferably has the same internal diameter as the return wellbore in which it is placed. Each flow chamber preferably includes a bidirectional ultrasonic flow sensor for determining the flow chamber flow rate.

For Flow Chamber Apparatus 1, the three juxtaposed pressure sensors are preferred in order to (i) determine the direction of wellbore return flow, and (ii) accurately determine the flow rate in the return wellbore. Because the bidirectional flow sensors in the flow chambers also indicates the direction of the mud flow, this also serves to confirm the flow direction determined by the pressure sensors. For floating offshore wells the location of Flow Chamber Apparatus 1 is preferably placed at least one marine riser joint below the bottommost position of the slip joint. For jack-up type offshore drilling operations Flow Chamber Apparatus 1 is preferably placed about 8 m (25 ft) below the blowout preventer. For onshore wells the Pressure Sensing Apparatus preferably replaces the bell nipple. Since the mud level in the return wellbore must be kept above Flow Chamber Apparatus 1 at all times, for both offshore and onshore wells Flow Chamber Apparatus 1 will also indicate the mud level in the return wellbore at all times.

For both offshore and onshore drilling operations the Flow Chamber Apparatus 1 is preferably removed after cessation of all drilling operations.

In summary, both the Pressure Sensing Apparatus and Flow Chamber Apparatus 1, by means of a central processor at the rig site, not only can it detect a fluid influx or efflux significantly earlier, such a central processor can also determine, and preferably display, at least one of (i) whether drilling mud is being lost or gained, (ii) the rate at which drilling mud is being lost or gained (iii) the increase or decrease in the return wellbore flow rate relative to the pump output, (iv) the cumulative volume of drilling mud lost or gained with time, (v) the level of the drilling mud in the return wellbore, and (vi) alarm the drilling operation per the operator's requested parameters.

Thus, the present invention provides in one presently preferred embodiment an apparatus for early detection of drilling mud flow rate changes in the return wellbore of oil and gas drilling operations. The apparatus comprises at least one pressure sensor having an upper and lower pressure sensor port positioned in a return wellbore of an oil and gas drilling operation, the return wellbore having a central axis. Preferably, the upper pressure sensor port and the lower pressure sensor port of each are positioned on an axis parallel to the central axis of the return wellbore. Preferably, the upper and lower pressure sensor ports of each pressure sensor is placed sufficiently for apart to detect a measurable, frictional pressure loss. Preferably, each of the upper and axially aligned lower pressure sensors ports are positioned in Flow Chamber Apparatus 1, at angle of 120 degrees from each of the adjacent upper pressure sensors.

Another presently preferred embodiment, Flow Chamber Apparatus 2, in essence is Flow Chamber Apparatus 1 without pressure sensing apparatuses. Flow Chamber Apparatus 2 further comprises a central pipe preferably having an internal diameter equal to the internal diameter of the return wellbore in which it is placed, an inlet port, an outlet port, and a flow tube preferably having an internal diameter of at least 76.2 mm (3 inches), having two curved pipe sections at each end and a straight pipe section preferably of at least ten flow tube internal pipe diameters in length, with the flow tube in fluid communication with the return wellbore through the inlet port and outlet port. The two curved pipe sections have an inside radius, preferably at least five flow tube diameters in length and they preferably meet the central pipe of Flow Chamber Apparatus 2 at an angle of 10 degrees. Here, the inlet port and the outlet port are formed in Flow Chamber Apparatus 2. Preferably, each flow chamber includes a bidirectional flow sensing device for determining the flow chamber flow rate and direction. Preferably, the outlet port and the inlet port are positioned on an axis parallel to the central axis of the central pipe. Preferably, the outlet port centerline is located at least 2 meters (6.6 feet) above the inlet port centerline. Preferably, the apparatus comprises three pairs of outlet and inlet ports positioned in the central pipe of Flow Chamber Apparatus 2. For both offshore and onshore drilling operations the Flow Chamber Apparatus 2 is preferably removed after cessation of all drilling operations.

All early detection apparatuses of the present invention preferably comprise a Flushing System enabling flushing of the apparatuses periodically to (i) clear flow chambers of debris, (ii) break the drilling mud's gel strengths in the event of a prolonged cessation of drilling operations, and (iii) clear all pressure sensor ports of debris. For any apparatus that connects to an offshore drilling operation, the upper and lower extremities are preferably to be fitted with the same connection as the marine riser utilized for the offshore drilling operation in question. Similarly, for any apparatus that connects to an onshore drilling operation, the lower extremity of said apparatus is preferably to be fitted to match the blowout preventer connection of the bell nipple.

The present invention also provides a method for the early detection of drilling mud flow rate changes in the return well bore of oil and gas drilling operations. The method includes monitoring and examining the determined differential pressure from all three pressure sensors positioned in the return wellbore. Notably, in the interest of safety in all drilling operations, all three pressure sensors are monitored to ensure that at least one pair of pressure sensors will permit the determination of the wellbore return flow rate, and whether the return wellbore is gaining or losing fluid. Which pressure sensor port has the higher pressure is preferably noted. Preferably, the return wellbore flow rate is calculated, and whether the return wellbore is gaining or losing fluid is established. Preferably, these results are compared with predetermined parameters. Preferably, one embodiment also includes monitoring at least one bidirectional ultrasonic flow sensor, noting the wellbore flow rate, and establishing whether the return wellbore is gaining or losing fluid. These results are preferably compared with predetermined parameters.

DETAILED DESCRIPTION

Figure 1:
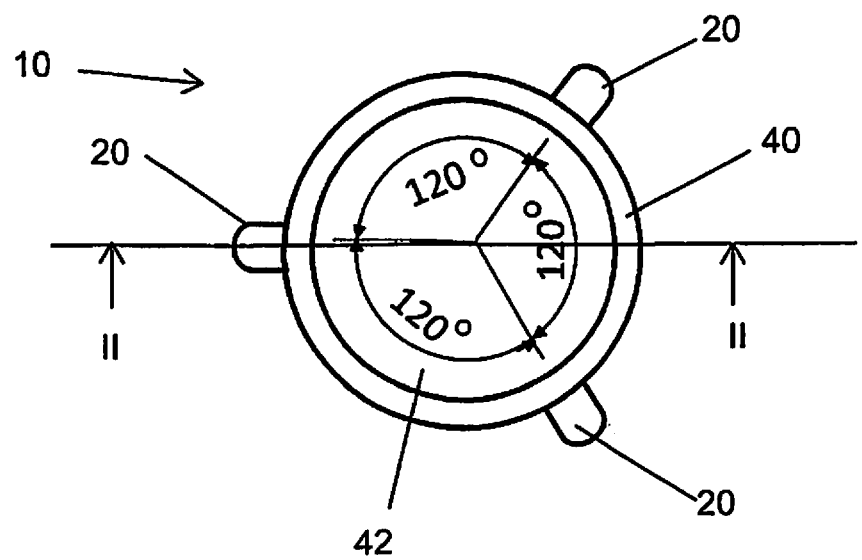
FIG. 1 is a schematic plan view of the early flow detection apparatus (Pressure Sensing Apparatus) of a first embodiment of the present invention.

The present invention provides, while drilling or circulating drilling mud, a system and apparatus for comparing the total annular drilling mud flow rate as it is determined relative to the totality of the drilling rig pump output, and any other fluids that are being pumped into the wellbore. The comparison will indicate whether drilling mud is gained from, or drilling mud is lost to, the formations in the open wellbore. The rate at which drilling mud is gained or lost can more accurately be determined after accounting for the increase in the wellbore flow rate due to the presence of drilled cuttings and wellbore cavings.

During tripping operations the level of the drilling mud in the wellbore must be maintained at least above the upper pressure sensor port. While the drill string is being removed from the wellbore, that is, while 'pulling out of the hole', after accounting for any drilling mud that is added from the trip tank and or elsewhere, comparing the downward, wellbore flow rate as determined in the present invention to the flow rate due to the upward directed displacement rate of the drill string, will establish whether the return wellbore is gaining or losing drilling mud while pulling out of the hole.

Similarly, while the drill string is re-entered into the wellbore, 'run in the hole', comparing the wellbore flow rate determined by this invention to the downward directed displacement rate of the drill string, the system and apparatus of the present invention can be employed to detect whether the wellbore is gaining formation fluid or drilling mud is being lost to the wellbore.

If the system and apparatus of the present invention detects a wellbore return flow while the drill string is motionless, and no drilling mud whatsoever is being pumped, such a wellbore return flow will indicate whether the wellbore is taking on oil, gas, or water from the open wellbore below or drilling mud is being lost to the wellbore.

As used in the present specification and claims, "return wellbore" means the annulus formed by the pipe and the contained drill string in the case of an offshore drilling operations, and in the case of an onshore drilling operations, noting that the apparatuses of this invention essentially replaces the entirety of bell nipple, for the sake of brevity, "return wellbore" is stated to mean the annulus formed by the replaced bell nipple and the contained drill string. "ID" means internal diameter.

In a first embodiment ("Pressure Sensing Apparatus"), the present invention provides apparatus and a method for monitoring any one or more of (i) the change in the drilling mud flow rate in the upper wellbore, (ii) the cumulative change in the total volume of drilling mud that is gained or lost, (iii) the direction of flow of the said drilling mud in the upper wellbore, and (iv) the level of the drilling mud in the upper wellbore. The Pressure Sensing Apparatus has at least one pair of pressure sensors positioned in the return wellbore, and thus the Pressure Sensing Apparatus is exposed/subjected to the combined annular flow of all fluids that are returning to the surface during a drilling operation. For offshore wells the internal diameter of the Pressure Sensing Apparatus is preferably equal to the internal diameter of the marine riser. For offshore wells the length of the Pressure Sensing Apparatus itself is preferably equal to the centerline length of the pressure sensors plus at least five internal marine riser pipe diameters above the upper pressure sensor plus at least five internal marine riser pipe-diameters below the lower pressure sensor. For offshore wells the Pressure Sensing Apparatus is placed at least one marine riser joint below the bottommost position of the slip joint. For jack-up type offshore drilling operations the Pressure Sensing Apparatus is preferably placed about 25 ft (8 m) below the blow out preventers. For offshore wells, the drilling mud level in the wellbore should be maintained at a level that is least one marine riser joint length above the Pressure Sensing Apparatus. For onshore wells the internal diameter of the Pressure Sensing Apparatus, is preferably equal to the nearest casing size that will pass the largest bit size over the drilling interval early flow detection is desired. For onshore wells the length of the Pressure Sensing Apparatus itself is preferably equal to the centerline length between the pressure sensor port, plus at least five times the interior diameter of the Pressure Sensing Apparatus above the upper pressure sensor port plus at least five times the interior diameter of the pressure sensing apparatus below the lower pressure sensor port, plus a short section of pipe having a flow line connection. For onshore wells the Pressure Sensing Apparatus preferably replaces the bell nipple otherwise typically employed. For onshore wells, the wellbore is preferably kept full at all times. For both offshore and onshore drilling operations the Pressure Sensing Apparatus is preferably removed after cessation of all drilling operations.

The early flow detection method of the present invention determines the flow direction by monitoring the three pressure sensors to establish the return wellbore flow rate and its direction. The apparatus of the present invention preferably includes means for monitoring the output of the sensing devices or sensors, such as electrical connections between the sensors and a central processor such as a general purpose or special purpose computer. In the early flow detection method the pressure sensing devices are preferably in communication, such as by electrical connection, with a central processor preferably placed at the surface above the wellbore. In this flow detection method a central processor receives signals from the pressure sensors, and determines, and preferably displays, at least one of (i) whether drilling mud is being lost or gained, (ii) the rate at which drilling mud is being lost or gained (iii) the increase or decrease in the wellbore flow rate relative to the pump output, (iv) the cumulative volume of drilling mud lost or gained, (v) the level of the drilling mud in the wellbore and (vi) alarms the drilling operation per an operator's requested parameters.

Figure 2:
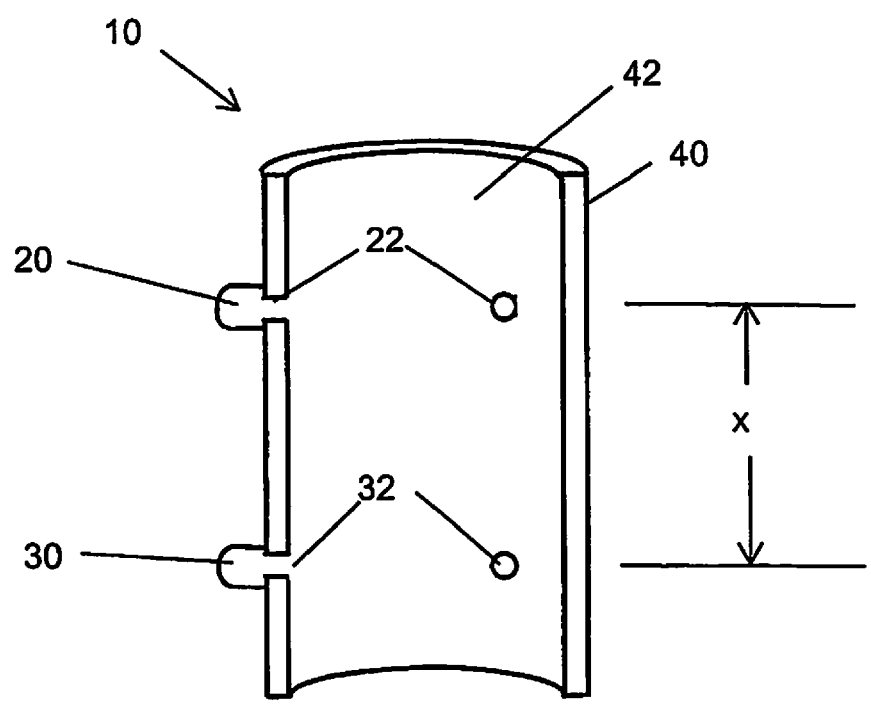
FIG. 2 is a schematic sectional side elevational view of the early flow detection apparatus of FIG. 1 taken along the line II-II.

Referring now to the figures in which like reference numerals represent like elements in each of the several views, there is shown in FIG. 1 a plan view of a first embodiment of a direct wellbore early return flow detection apparatus 10 for both offshore and onshore drilling operations according to the present invention. FIG. 2 is a sectional side elevational view of the apparatus 10 of FIG. 1 taken along the line II-II. The apparatus 10 includes a first and a second set of pressure sensors 20, 30 positioned in the central pipe of the apparatus 40 for detecting the wellbore return flow in offshore or onshore oilwell drilling operations. In particular, each of the pressure sensors 20, 30 is preferably spaced along radii at 120 degrees from the adjacent pressure sensors 20, 30 in a common plane normal to the axis of the central pipe of the apparatus 40. The two sets of pressure sensors 20, 30 are preferably spaced at a distance x from each other along the axis of the central pipe of the apparatus 40. Preferably, the distance x is long enough in order to detect a measurable, frictional pressure loss. In the illustrated embodiment, the first set of sensors 20 are preferably positioned directly above the second set of sensors 30, such that centerlines through the first set of sensors 20 are aligned with centerlines through the second set of sensors. The pressure sensors 20, 30 are in fluid communication with the interior 42 of the central pipe of the apparatus 40 through ports 22, 32 formed in the central pipe of the apparatus 40.

In a second embodiment ("Flow Chamber Apparatus 1") the present invention provides apparatus and a method for continuously detecting and monitoring any one or more of the following: (i) the change in the flow rate of the drilling mud in the upper wellbore, (ii) the cumulative change in the total volume of drilling mud that is gained or lost, (iii) the direction of flow of the said drilling mud in the upper wellbore, and (iv) the level of the drilling mud in the upper wellbore. The Flow Chamber Apparatus 1 has at least one flow chamber and one pair of pressure sensors (that is, an upper pressure sensor and a lower pressure sensor) in the central pipe of Flow Chamber Apparatus 1, such that the Flow Chamber Apparatus 1 is exposed/subjected to the combined annular flow of all fluids that are returning to the surface during a drilling operation. Preferably, for offshore wells the internal diameter of the central pipe of Flow Chamber Apparatus 1 is preferably equal to the internal diameter of the marine riser. Preferably, for offshore wells the length of Flow Chamber Apparatus 1 itself is equal to the centerline length of the pressure sensor ports, plus at least five internal marine riser pipe diameters above the upper pressure sensor port, plus at least five internal marine riser pipe diameters below the lower pressure sensor port. For offshore wells the Flow Chamber Apparatus 1 is preferably located at least one marine riser joint below the bottommost position of the slip joint. For jack-up type offshore drilling operations the Flow Chamber Apparatus 1 is preferably placed about 8 m (25 ft) below the blowout preventers. For offshore wells, the drilling mud level in the wellbore is preferably maintained at a level that is at least one marine riser joint length above Flow Chamber Apparatus 1. For onshore wells the internal diameter for the central pipe of Flow Chamber Apparatus 1, is preferably equal to the nearest casing size ("preferred casing ID") that will pass the largest bit size over the drilling interval that early flow detection is desired. For onshore wells the length of Flow Chamber Apparatus 1 itself is preferably equal to the centerline length of the pressure sensor ports, plus at least five preferred casing IDs above the upper pressure sensor port plus at least five preferred casing IDs below the lower pressure sensor port, plus a short section of pipe having a flow line connection and whose internal diameter is also equal to the preferred casing ID. For onshore wells, the Flow Chamber Apparatus 1 is preferably located on top of the blowout preventer. In essence, Flow Chamber Apparatus 1 thus replaces the bell nipple. For onshore wells, at the commencement of drilling operations, it may be necessary to deepen the depth of the cellar in order to accommodate Flow Chamber 1. For onshore wells, the wellbore is preferably kept full at all times. For either offshore or onshore drilling operations the flow sensor Flow Chamber Apparatus 1 is preferably bidirectional ultrasonic flow sensor. For both offshore and onshore drilling operations the Flow Chamber Apparatus 1 is preferably removed after cessation of all drilling operations.

For the early flow detection method of the present invention, which is primarily for the safety of drilling operations, the pressure sensors are utilized in order to determine the return wellbore flow rate and whether fluid is being gained or lost. Preferably, in the present early flow detection method the pressure sensing devices and the flow sensing devices are in communication, such as by electrical connection, with a central processor, preferably placed in the control center of the drilling operation. In this flow detection method a central processor receives signals from the pressure sensors, and determines and preferably displays at least one of (i) whether drilling mud is being lost or gained, (ii) the rate at which drilling mud is being lost or gained (iii) the increase or decrease in the wellbore flow rate relative to the total fluid input rate (iv) the cumulative volume of drilling mud lost or gained, (v) the level of the drilling mud in the wellbore and (vi) alarms the drilling operation per an operator's requested parameters.

Figure 3:
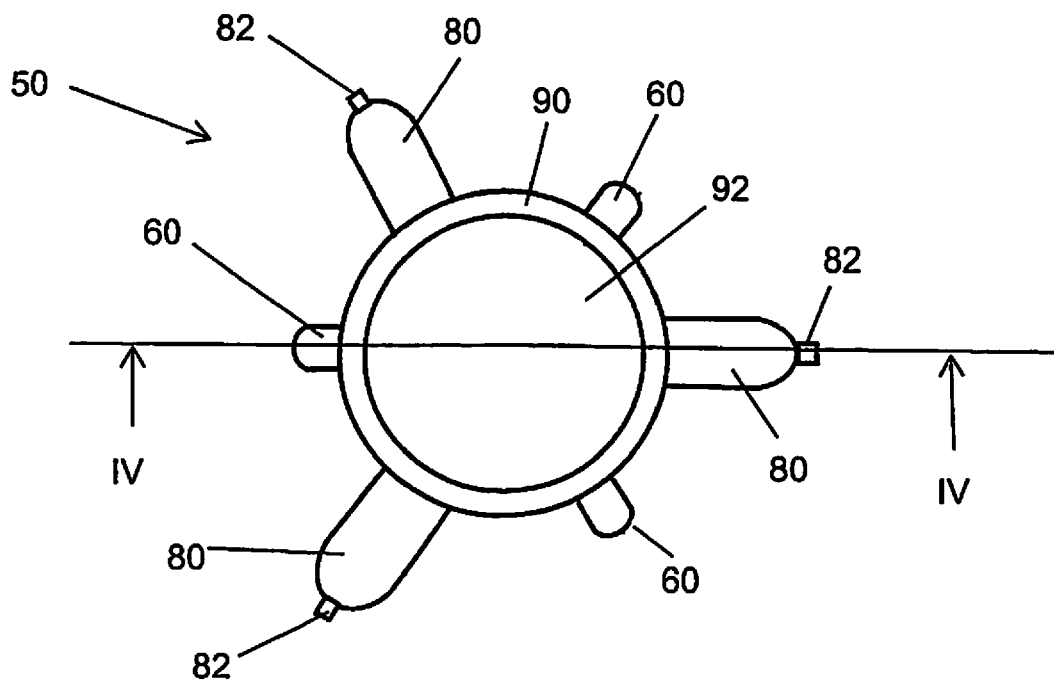
FIG. 3 is a schematic plan view of an early flow detection apparatus ("Flow Chamber Apparatus 1") of a second embodiment of the present invention that is adapted for offshore drilling operations.
Figure 4:
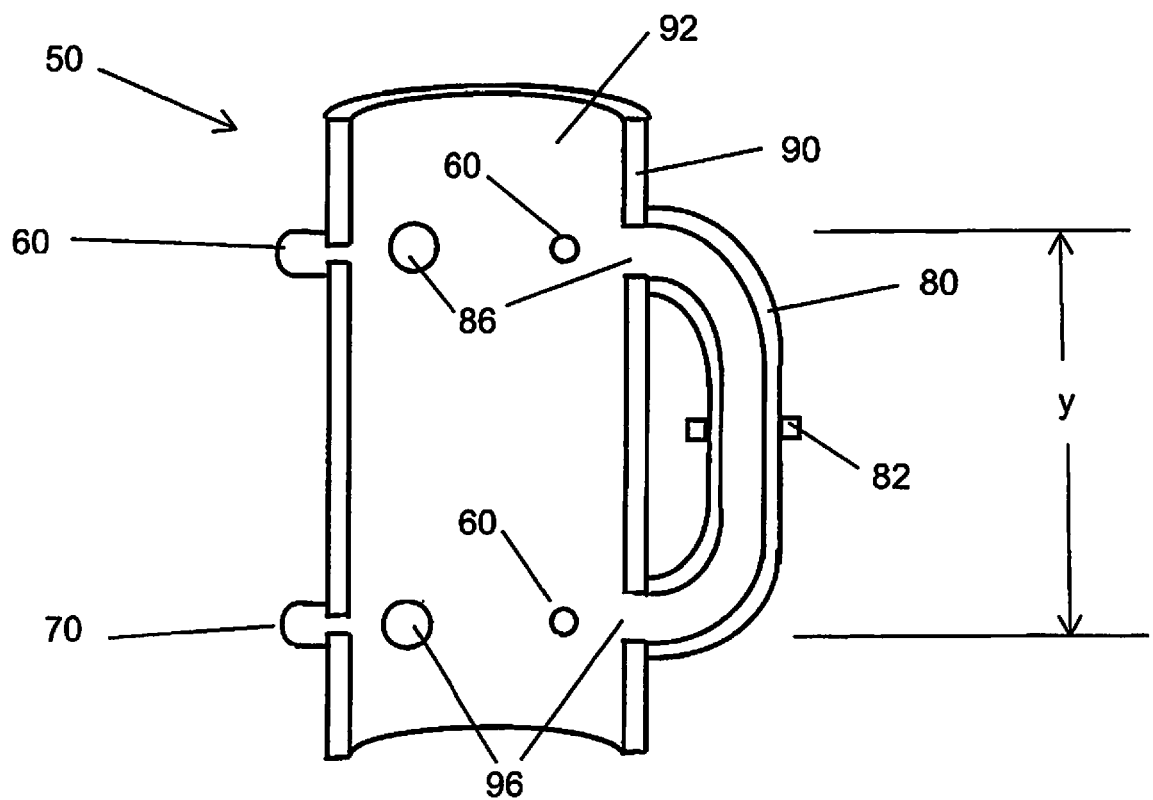
FIG. 4 is a schematic sectional side elevational view of the early flow detection apparatus of FIG. 2 taken along the line IV-IV.

FIGS. 3 and 4 relate to a second embodiment of early flow detection apparatus 50 according to the present invention ("Flow Chamber Apparatus 1), which is more suitable for offshore drilling operations. As shown in the plan view of FIG. 3 the early flow detection apparatus 50 includes a plurality of flow chambers 80 spaced around the central pipe of the apparatus 90 for diverting flow from the lower portion of the central pipe of the apparatus 90 to an upper portion of the central pipe of the apparatus 90 as can be seen in the sectional elevational view of FIG. 4 taken along the line IV-IV of FIG. 3. Each flow chamber 80 preferably extends from a common upper plane normal to the axis of the return wellbore 90 to a common lower plane normal to the axis of the return wellbore and generally in parallel with the axis of the central pipe of the apparatus 90. Each flow chamber 80 preferably includes a sensing device 82 for determining the flow chamber flow rate. Preferably, each of the flow chambers 80 is preferably spaced along radii at 120 degrees from the adjacent flow chambers 80 in a common plane normal to the axis of the return wellbore 90. Each flow chamber includes an inlet port 96 formed in the return wellbore 90 and an outlet port 86 formed in the central pipe of the apparatus 90, the inlet ports 96 and outlet ports 86 being preferably spaced a distance y from each other along the axis of the central pipe of the apparatus 90 and in fluid communication with the interior of the central pipe of the apparatus 90. In addition, the apparatus 50 preferably includes a first and a second set of pressure sensors 60, 70 positioned in the central pipe of the apparatus 90 for detecting the wellbore return flow in offshore oilwell drilling operations. In particular, each of the pressure sensors 60, 70 is preferably spaced along radii at 120 degrees from the adjacent pressure sensors 60, 70 in a common plane normal to the axis of the central pipe of the apparatus 90, and preferably spaced 60 degrees from the ports 86, 96 of the adjacent flow chambers 80. The two sets of pressure sensors 60, 70 are preferably spaced at a distance x from each other along the axis of the central pipe of the apparatus 90. In the illustrated embodiment, the first set of sensors 60 are preferably positioned directly above the second set of sensors 70, such that centerlines through the first set of sensors 60 are aligned with centerlines through the second set of sensors 70. The pressure sensors 60, 70 are in fluid communication with the interior 92 of the return wellbore 90 through ports 62, 72 formed in the central pipe of the apparatus 90. In the illustrated embodiment, the first set of sensors 60 lie in a common plane with the outlet ports 86 of the flow chambers 80 and the second set of sensors 70 lie in a common plane with the inlet ports 96 of the flow chambers 80. Thus, the two sets of pressure sensor inlets 62, 72 are preferably circumferentially positioned directly opposite to the respective three flow chambers ports 86, 96 in the central pipe of the apparatus 90.

For Flow Chamber Apparatus 1 50 the two sets of three juxtaposed pressure sensors 60, 70 are employed to (i) determine the direction of wellbore return flow, and (ii) accurately determine the upper wellbore flow rate.

Non-mechanical, preferably ultrasonic, flow sensing devices 82, are preferably placed at the midpoint of the flow chambers 80.

Figure 5:
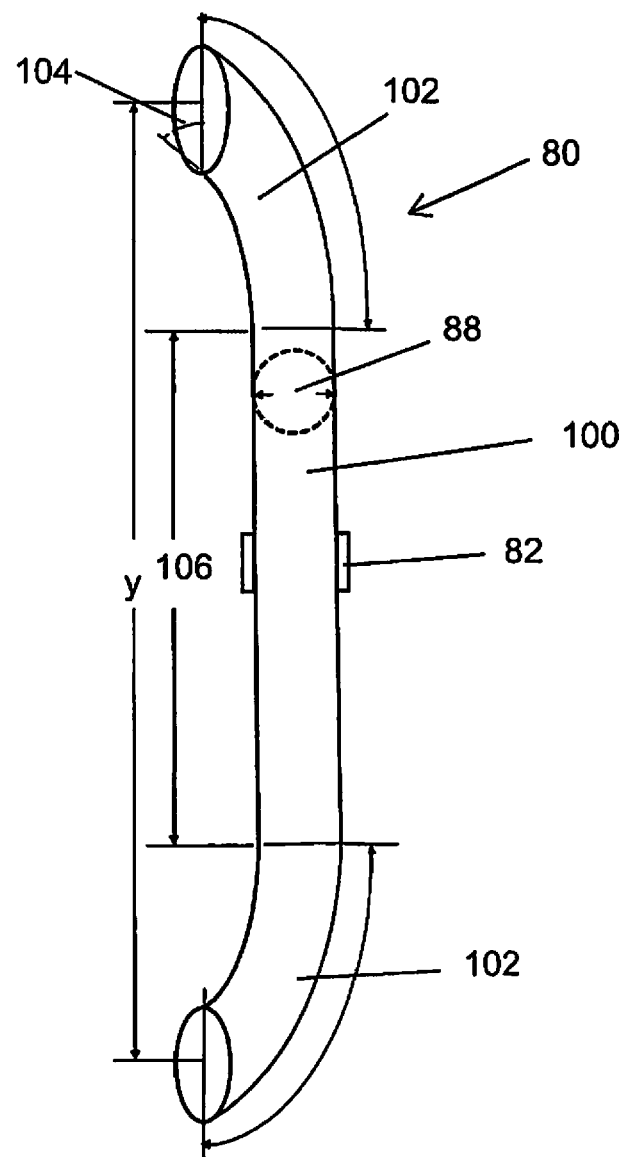
FIG. 5 is a side elevational section view of the flow chamber of the early flow detection apparatus of FIG. 3.

With reference to FIG. 5, each flow chamber 80 preferably has a circular cross-section having an internal diameter 88. The straight mid-section 100 of the flow chamber 80 is of sufficient length to ensure that the flow rate sensor 82 is free of turbulence which may be created due to minor entrance losses and pipe curvature. At the ends of the straight mid-section 100 are two equal length sections of curved pipe 102 of the same diameter 88. Where the two curved pipes 102 meet the flow chamber mid-section 100 the curved pipes 102 are tangent to straight pipe 100 and the points where the drilling mud enters into and exits from the flow chamber the curved pipes are entrance and exit angle 104. The flow chamber centerline length 106 is sufficiently long to measure a pressure differential accurately for the two preferably juxtaposed pressure sensors 60, 70 which preferably are transducers or differential pressure transducers.

In a third embodiment ("Flow Chamber Apparatus 2"), the present invention provides apparatus and a method for monitoring any one or more of (i) due to the lack of pressure sensors, only an estimate of the change in the drilling mud flow rate in the upper wellbore, (ii) the cumulative change in the total volume of drilling mud that is gained or lost, (iii) the direction of flow of the said drilling mud in the upper wellbore, and (iv) the level of the drilling mud in the upper wellbore. Flow Chamber Apparatus 2 is preferably provided with at least one bidirectional flow sensor. For this early flow detection method there are no pressure sensors. Preferably, for this early flow detection method a central processor receives, determines and preferably displays at least one of (i) whether drilling mud is being lost or gained, (ii) an estimate of the rate at which drilling mud is being lost or gained (iii) an estimate of the increase or decrease in the wellbore flow rate relative to the pump output, (iv) an estimate of the cumulative volume of drilling mud lost or gained, (v) the level of the drilling mud in the wellbore and (vi) alarms the drilling operation per an operator's requested parameters.

Figure 6:
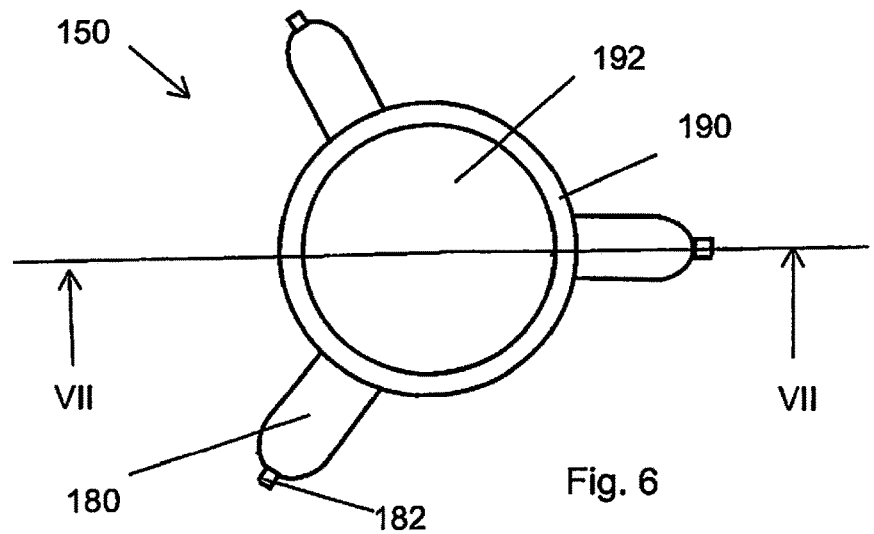
FIG. 6 is a schematic plan view of the of an early flow detection apparatus ("Flow Chamber Apparatus 2"), a flow chamber variant of the second embodiment of the present invention without any pressure sensors that is more suitable for offshore drilling operations.
Figure 7:
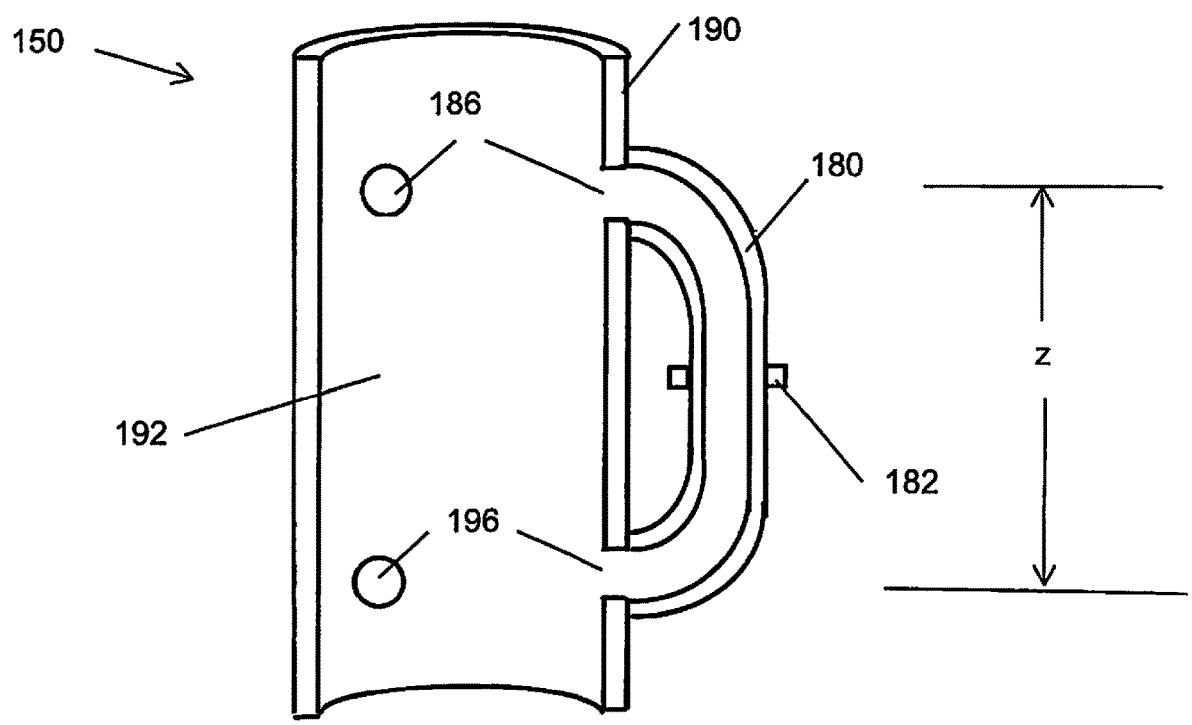
FIG. 7 is a schematic sectional side elevational view of the early flow detection apparatus of FIG. 6 taken along the line VII-VII.

FIGS. 6 and 7 relate to a third embodiment of early flow detection apparatus 150 according to the present invention ("Flow Chamber Apparatus 2), which is more suitable for offshore drilling operations. As shown in the plan view of FIG. 6 the early flow detection apparatus 150 includes a plurality of flow chambers 180 spaced around the central pipe of the apparatus 190 for diverting flow from the lower portion of the return wellbore 190 to an upper portion of the central pipe of the apparatus 190 as can be seen in the sectional elevational view of FIG. 7 taken along the line VII-VII of FIG. 6. Each flow chamber 180 preferably extends from a common upper plane normal to the axis of the central pipe of the apparatus 190 to a common lower plane normal to the axis of the return wellbore and generally in parallel with the axis of the central pipe of the apparatus 190. Each flow chamber 180 preferably includes a flow sensing device 182 for determining the flow chamber flow rate. Preferably, each of the flow chambers 180 is preferably spaced along radii at 120 degrees from the adjacent flow chambers 180 in a common plane normal to the axis of the central pipe of the apparatus 190. Each flow chamber includes an inlet port 196 formed in the central pipe of the apparatus 190 and an outlet port 186 formed in the central pipe of the apparatus 190, the inlet ports 196 and outlet ports 186 being preferably spaced a distance z from each other along the axis of the return wellbore 190 and in fluid communication with the interior of the return wellbore 192. Preferably, the distance z is at least long enough to assure that the flow sensing devices 182 are not affected by turbulence due entrance effects at the inlet ports 196, due to flow chamber 180 curvature effects and due to exit effects at the outlet ports 186.

The early flow detection apparatus is preferably installed below the slip joint or the blowout preventer in offshore drilling operations or, in onshore drilling operations it replaces the bell nipple.

For the Pressure Sensing Apparatus, Flow Chamber Apparatus 1, or Flow Chamber Apparatus 2, only one set of sensing devices, is necessary for early flow detection in either offshore or onshore drilling operations. Preferably, however, because lives are always at risk in any oilwell drilling operation, for the Pressure Sensing Apparatus Flow Chamber Apparatus 1 and Flow Chamber Apparatus three sets of sensing devices are preferred to assure that the early detection methods for the return wellbore losses and gains of this invention can be recorded and displayed in real time at all times, under any, and all, wellbore conditions and any other operational modes of a drilling operation.

In an alternative embodiment, the Pressure Sensing Apparatus can be replaced with least one set of pressure sensor pairs that is are attached to the upper return wellbore and arranged similarly to the pressure sensors of the Pressure Sensing Apparatus.

In another alternative embodiment, for preferably offshore drilling operations, Flow Chamber Apparatus 1 can be replaced by at least one flow chamber with its similarly attached bidirectional flow sensor and at least one pressure sensor inclusive its pressure sensing ports that are attached to the marine riser at some point below the slip joint or the blowout preventer, for floating offshore installations and jack-up style installations respectively, all being arranged similarly to the pressure sensing devices, the flow chamber and flow sensing device arrangement of Flow Chamber Apparatus 1.

Virtually any pressure sensing device can be employed in the apparatus of the present invention. Notwithstanding other pressure sensing devices, pressure sensing devices that can be employed in the apparatuses of this invention include bidirectional differential pressure transducers, differential pressure transducers, pressure transmitters, wet/wet differential pressure transducers, wet/wet differential pressure transmitters, thin film differential pressure transducers, silicon pressure sensors, thermal pressure sensors, piezoelectric pressure sensors, piezoresistive pressure sensors, digital pressure gauges, or mechanical (Bourdon tube) gauges.

Propeller type flow sensors are preferably not utilized in any of the three apparatuses of this invention because these types of flow sensors have been established to not detect flow below about 1 $m^3$/min (6 bpm) for water and below about 1.7 $m^3$/min (10 bpm) for a typical 60 sec/qt funnel viscosity drilling mud. With the exception of a propeller as a flow sensing devices, virtually any other flow sensing device can be employed in the apparatus of the present invention. Noting the inadequacy of propeller like flow sensors to detect sufficiently low return wellbore flow rates, notwithstanding other flow sensing devices which may be employed in the present invention include ultrasonic flow sensors, thermal flow sensors, transducer flow sensors, hot film anemometer flow sensors, wedge type flow sensors meters, pitot tube type flow sensors meters, orifice plate flow meters, venturi tube flow meters, rotating vane flow meters or, for water based drilling muds only, electromagnetic flow sensors.

The apparatus of the present invention preferably includes means for monitoring the output of the sensors and/or sensing devices employed, such as for example, means for conditioning and/or amplifying the electrical output of the sensors and or sensing devices, such as analog to digital convertors, electronic amplifiers, multiplexers for encoding signals from multiple sensors, and signal conditioning circuits. Further such means preferably include means for transmitting the electrical output from the sensors to an electronic processing unit such as a general purpose or specialized computer. The transmission means can include one or more dedicated wires, or encoders for adding the sensor output signal to other control or sensing lines. The electronic processing unit can include signal conditioning circuits, demultiplexers, display devices, and signal processing software.

Various modifications can be made in the details of the various embodiments of the systems, apparatus and methods of the present invention, all within the scope and spirit of the invention and defined by the appended claims.

The invention claimed is:

1. Apparatus for early detection of drilling mud gains or losses that is positioned in a return wellbore of oilwell drilling operations, comprising at least one flow chamber having a central pipe, the central pipe having a central axis, an inlet port, an outlet port, and a flow tube, the flow tube being in fluid communication with the central pipe through the inlet port and outlet port, the inlet port and the outlet port being formed in the central pipe, the flow chamber further including a sensing device for determining the flow chamber flow rate.

2. Apparatus according to claim 1 wherein the outlet port and the inlet port are positioned on an axis parallel to the central axis of the central pipe.

3. Apparatus according to claim 2 wherein distance between the outlet port and the inlet port is at least long enough to assure that the flow sensing device is not affected by turbulence due entrance effects at the inlet port, due to flow tube curvature effects and due to exit effects at the outlet port.

4. Apparatus according to claim 2 comprising three pairs of outlet and inlet ports positioned in the central pipe.

5. Apparatus according to claim 1 further comprising means for monitoring the output of the flow sensing device.

* * * * *